C. A. Murray,
Piston Packing.
No. 36,016.  Patented July 29, 1862.
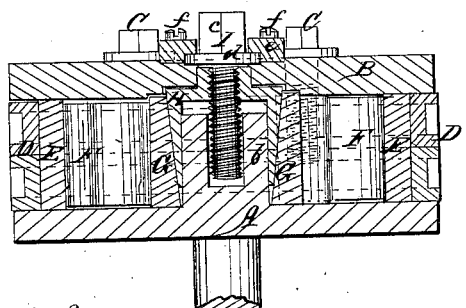
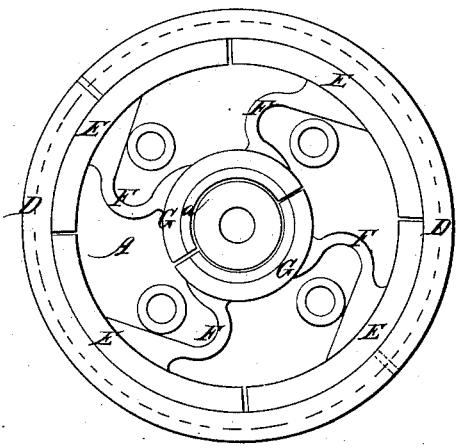 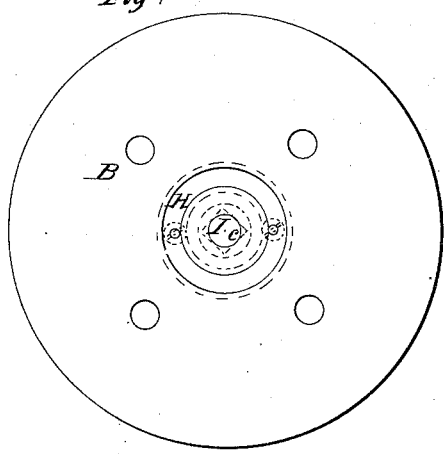
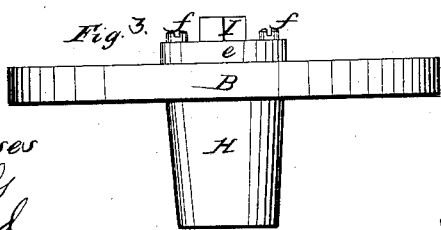
Witnesses
J. W. Coombs
G. W. Reed
Inventor
C. A. Murray
per Munn & Co
Atty's

UNITED STATES PATENT OFFICE.

CHARLES A. MURRAY, OF PITTSBURG, PENNSYLVANIA.

IMPROVEMENT IN PISTON-PACKING.

Specification forming part of Letters Patent No. 36,016, dated July 29, 1862.

*To all whom it may concern:*

Be it known that I, CHARLES A. MURRAY, of Pittsburg, in the county of Allegheny and State of Pennsylvania, have invented a new and Improved Piston-Packing; and I do hereby declare that the following is a full, clear, and exact description of the same, reference being had to the accompanying drawings, forming a part of this specification, in which—

Figure 1 represents a vertical central section of my invention. Fig. 2 is a plan or face view of the same, the follower having been removed to expose the internal parts of my packing. Fig. 3 is a side elevation of the follower detached. Fig. 4 is an inverted plan of the follower.

Similar letters of reference in all the figures indicate corresponding parts.

The object of this invention is to produce a light and reliable packing, which can be easily adjusted, and which, by its yielding properties, will not injure the inside of the cylinder.

The invention consists in the arrangement on the interior of the ordinary packing-rings of four (more or less) segmental rings, which connect by means of springs with the sections of a conical socket in such a manner that by expanding said socket the segmental rings are made to bear upon the inner surface of the packing-rings with a yielding pressure, thereby keeping said rings tight without injury to the inner surface of the cylinder.

It consists, further, in the arrangement of a collar at the head of the screw, which serves to operate the conic frustum, through the entrance of which the segmental rings are expanded in such a manner that under said head a steam-tight joint is produced.

To enable those skilled in the art to make and use my invention, I will proceed to describe its construction and operation with reference to the drawings.

A represents the piston-head, which is formed and connected to the piston-rod in the usual manner. The follower B is connected to the head A by means of screws C, and the space between the follower and the head is occupied by the split rings D, which form the packing of the piston. These packing-rings are expanded and made to bear steam-tight on the inner surface of the cylinder by means of segmental rings E, which connect, by springs F, (see Fig. 2,) with the hub G. This hub is also split in two or more sections, and it is bored out, so that it forms a conical socket, a, which receives the conic frustum H. (See Fig. 1.) This frustum is hollow, so as to pass freely over the boss b of the piston-head, and it is connected to the follower by a screw, I, in such a manner that by turning said screw the frustum is moved toward or from the piston-head. By forcing the frustum toward the piston-head the hub G, and with it the segmental rings E, are expanded, and the packing-rings D are made to bear on the inner surface of the cylinder. By the springs F, between the hub and the segmental rings, the pressure on the packing-rings is rendered yielding, and the inner surface of the cylinder is not injured, whereas if the hub and the segmental rings are connected by rigid arms, the packing-rings bear hard upon the inner surface of the cylinder, and the piston works hard, and the cylinder, with the piston, wears out in a short time. The screw I is operated by a square head, c, and it is provided with a collar, d, which fits into a recess in the outer surface of the follower, being retained in its place by a disk, e, that is attached to the follower by means of screws f. By these means the screw is permitted to rotate freely; but it is prevented moving in a longitudinal direction, and it can easily be operated through an aperture in the cylinder-head, which may be opened or closed by a suitable plug. The collar d bears steam-tight against the inner surface of the disk e, which is screwed down firmly to the follower, so that no steam is allowed to pass through on the sides of the screw-head.

This packing is very simple in its construction. It is perfectly reliable and not injurious to the cylinder, and it can easily be adjusted without removing the follower of the piston or the cylinder-head.

Having thus fully described my invention, what I claim as new, and desire to secure by Letters Patent, is—

1. The arrangement of the springs F, in combination with the split hub G, provided with the conical socket a, segmental rings E, and packing-rings D, all constructed and operating substantially as and for the purpose described.

2. The arrangement of the collar d on the head of the screw I, in combination with the disk e, as and for the purpose set forth.

CHARLES A. MURRAY.

Witnesses:
THOS. THOMPSON,
THEO. ROBINS.